United States Patent [19]

Hanon

[11] Patent Number: 4,951,002
[45] Date of Patent: Aug. 21, 1990

[54] BATTERY POWERED IN-LINE AMPLIFIER

[75] Inventor: David O. Hanon, Ringgold, Ga.

[73] Assignee: Plantronics, Inc., Santa Cruz, Calif.

[21] Appl. No.: 337,318

[22] Filed: Apr. 13, 1989

[51] Int. Cl.⁵ .............................................. H03G 3/20
[52] U.S. Cl. .................................... 330/151; 330/261;
330/297; 379/387; 379/413
[58] Field of Search ............... 330/151, 254, 261, 282,
330/283, 297; 379/52, 387, 413

[56] References Cited

U.S. PATENT DOCUMENTS

| 3,600,696 | 8/1971 | Grandmont | 330/151 X |
| 4,442,408 | 4/1984 | Le | 330/261 |
| 4,792,977 | 12/1988 | Anderson et al. | 381/68 X |

Primary Examiner—James B. Mullins
Attorney, Agent, or Firm—Arnold, White & Durkee

[57] ABSTRACT

An in-line amplifier is readily connectable to a standard telephone so as to allow for user adjustment of the volume presented to the receiver portion 15 of the handset 14. The in-line amplifier draws electrical power from a replaceable battery 18 so as to be easily attached to the telephone base unit 12. The in-line amplifier includes a voltage level detector 20, which operates to determine when the battery voltage level has fallen below the minimum operating voltage of the in-line amplifier. Ordinarily, the audio signal is passed from the telephone base unit 12 through a controllable amplifier 16 to the receiver portion 15 of the handset 14. However, when the voltage level detector 20 determines that the battery voltage level has fallen below the minimum operating voltage level, a signal is delivered to a low voltage bypass 17, providing a direct electrical path around the controllable amplifier 16 so as to couple the audio signal directly from the base unit 12 to the receiver 15. Within the controllable amplifier 16 a modified class B output stage is employed to provide the current driving capabilities necessary for proper operation of the receiver 15.

12 Claims, 3 Drawing Sheets

BATTERY POWERED IN-LINE AMPLIFIER

BACKGROUND OF THE INVENTION

1. Field of the Invention

This invention relates generally to a battery operated in-line audio amplifier and, more particularly, to an audio amplifier that employs high and low current modes of operation to extend battery life.

2. Description of the Related Art

Standard telephones typically do not include any provision for adjusting the volume of the conversation presented to the receiver portion of the telephone handset. Accordingly, where there is a poor connection or the user is hard of hearing, the volume of the conversation may be undesirably low. The user has little recourse other than asking the other party to speak more loudly. Therefor, it is desirable that the user have available an inexpensive in-line amplifier that is readily attached to a standard telephone and adjustable to the user's desired comfort level. In order for the in-line amplifier to be readily attachable to a standard telephone, it requires access to an independent source of electrical power. To avoid modifications of the telephone it is desirable that this independent electrical power source be in the form of a readily interchangeable battery.

However, use of a battery as the electrical power source for the in-line amplifier imposes severe limitations on the design of the in-line amplifier. For example, an operational amplifier used in the in-line amplifier typically lacks the current driving capability to properly operate the receiver of the telephone handset beyond relatively low level conversation. Therefor, an output stage, such as an emitter follower that draws current directly from the battery, is employed. High quality reproduction of the audio signal can be achieved by using a class A output stage, however, class A output stages typically suffer from low efficiency and high quiescent currents. It should be apparent that the use of a class A output stage will severely shorten the life of the battery and necessitate undesirably frequent changing of the battery.

Alternatively, class B output stages are well known for their high efficiency and low quiescent current draw. However, class B output stages are equally well known for the cross over distortion resulting from the dead band surrounding the zero voltage level. This dead band is, of course, caused by the complimentarily connected transistors in a class B output stage being simultaneously biased "off." Thus, while the battery life of such a device would be greatly enhanced over class A output stage, the audio signal presented to the receiver of the telephone handset would be unacceptably distorted.

Further, it should be appreciated that use of battery power for the in-line amplifier dictates that the battery will periodically discharge to such a low level as to be unable to operate the amplifier. At this point, the amplifier not only does not amplify the audio signal, but also blocks the audio signal from being delivered to the telephone handset. Thus, the user is presented with the alternatives of removing the in-line amplifier or replacing the battery so that the telephone is once again operable. Neither alternative is desirable. Rather, it is preferable that in-line amplifier should be capable of controllably enhancing the audio signal without undesirably blocking the audio signal.

The present invention is directed to overcoming one or more of the problems set forth above.

SUMMARY OF THE INVENTION

The primary object of the present invention is to provide an apparatus that amplifies audio signals using power supplied by a battery, but minimizes the current required from the battery.

Another object of the present invention is to provide an audio amplifier that has an extremely low quiescent current.

Yet another object of the present invention is to provide an audio amplifier that effectively by-passes the amplification stage in response to low battery voltage.

Still another object of the present invention is to provide an audio amplifier that has high and low current modes of operation in order to extend battery life.

Still another object of the present invention is to provide an audio amplifier that reduces crossover distortion caused by the use of a class B output stage.

To attain these and other objectives, an apparatus is provided for controllably amplifying an audio signal delivered to a receiver. The apparatus includes a battery adapted to provide electrical power to the apparatus and a means for detecting the voltage level of the battery and delivering first and second signals in response to the battery voltage being respectively greater than and less than a preselected level. Further, means receives the audio signal and amplifies the audio signal in response to receiving the first signal. Conversely, means receives the audio signal and by-passes the amplifier means to deliver the audio signal directly to the receiver in response to receiving the second signal.

BRIEF DESCRIPTION OF THE DRAWINGS

Other objects and advantages of the invention will become apparent upon reading the following detailed description and upon reference to the drawings in which.

Figure 1:
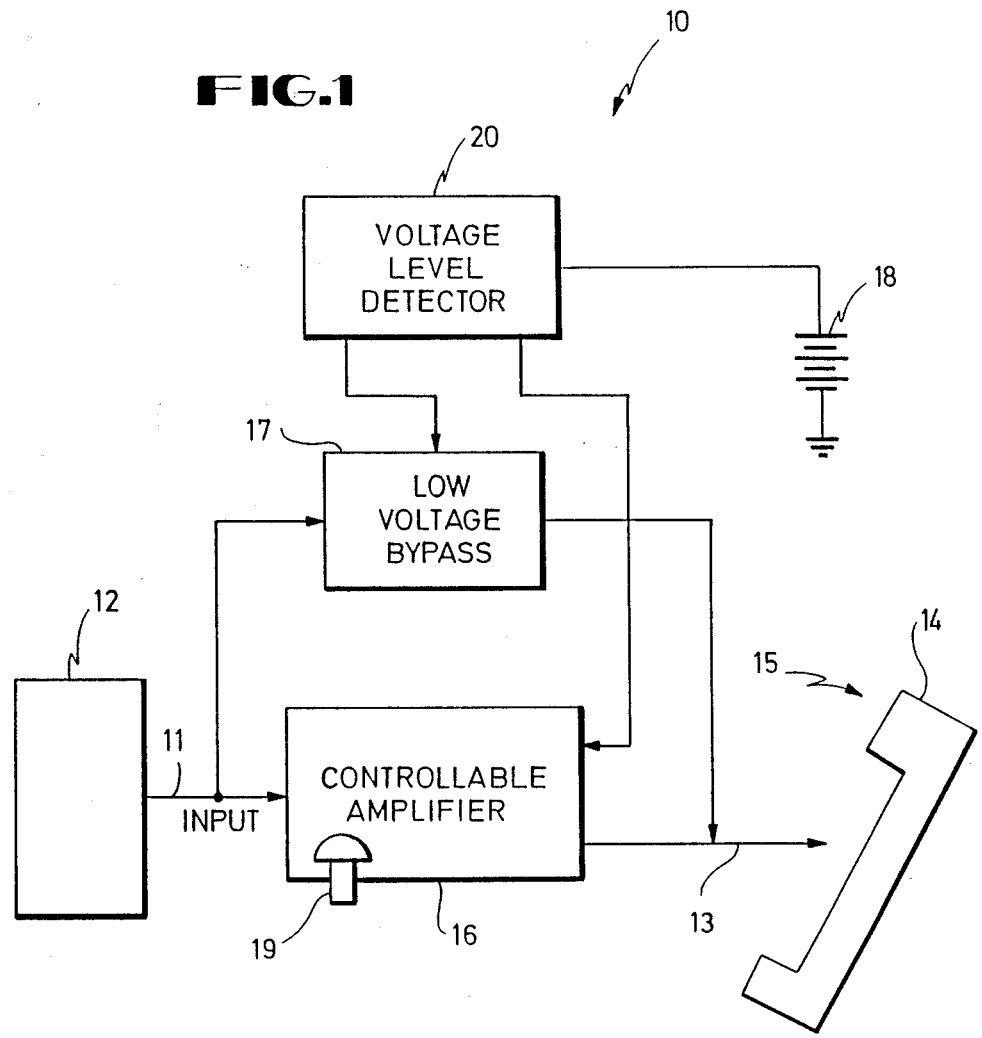
FIG. 1 is a general block diagram of the instant apparatus.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives within the spirit and scope of the invention as defined by the appended claims.

DETAILED DESCRIPTION OF PREFERRED EMBODIMENT

FIG. 1 illustrates a general block diagram of the apparatus 10. The apparatus 10 has an input line 11 connected to the base of a telephone unit 12 and an output line 13 connected to a handset 14 and, in particular, to the receiver portion 15 of the handset 14.

The input line 11 and output line 13 are alternatively connected together through either a controllable amplifier 16 or a low voltage bypass 17. The apparatus 10 is powered via a source of electrical energy, such as a battery 18. The use of the battery 18 dictates that the apparatus 10 periodically discharges the battery 18 to such a level as to require replacing the battery 18. It is preferable, therefor, that the apparatus 10 be capable of passing the audio signal from the base unit 12 to the receiver 15 independent of the state of charge of the battery 18. Thus, the low voltage bypass 17 is provided as an alternative connection between the receiver 15 and base 12 when the voltage level of the battery 18 is insufficient to properly operate the controllable amplifier 16.

It should be appreciated that the apparatus 10 is intended for use on telephones of individuals who are hard of hearing and require additional amplification of the audio signal in order to properly carry on a telephone conversation. In order to accommodate adjustment of the level of amplification, a potentiometer 19 is provided in the apparatus 10 and is directly accessible by the user of the telephone to adjust the comfort level of the amplification. Alternatively, a resistor controlled by a field effect transistor could be employed to allow for pushbutton adjustment of the amplification.

In order to determine when the voltage level 18 is at a minimum operating level, a voltage level detector 20 is provided. The voltage level detector 20 includes a pair of outputs connected respectively to the low voltage bypass 17 and the controllable amplifier 16. Ordinarily, when the voltage level of the battery exceeds the minimum preselected operating voltage level, the voltage level detector 20 provides electrical power to the controllable amplifier 16 so as to allow for amplification of the signal delivered from the base unit 12 over the input line 11. When, however, the voltage level of the battery 18 falls to a level below the preselected minimum operating voltage, the voltage level detector 20 delivers a control signal to the low voltage bypass 17 providing a substantially direct connection between the input and output lines 11, 13. Further, the voltage level detector 20 also discontinues delivering power to the controllable amplifier 16 in response to the battery voltage level falling below the preselected minimum operating voltage.

Figure 2:
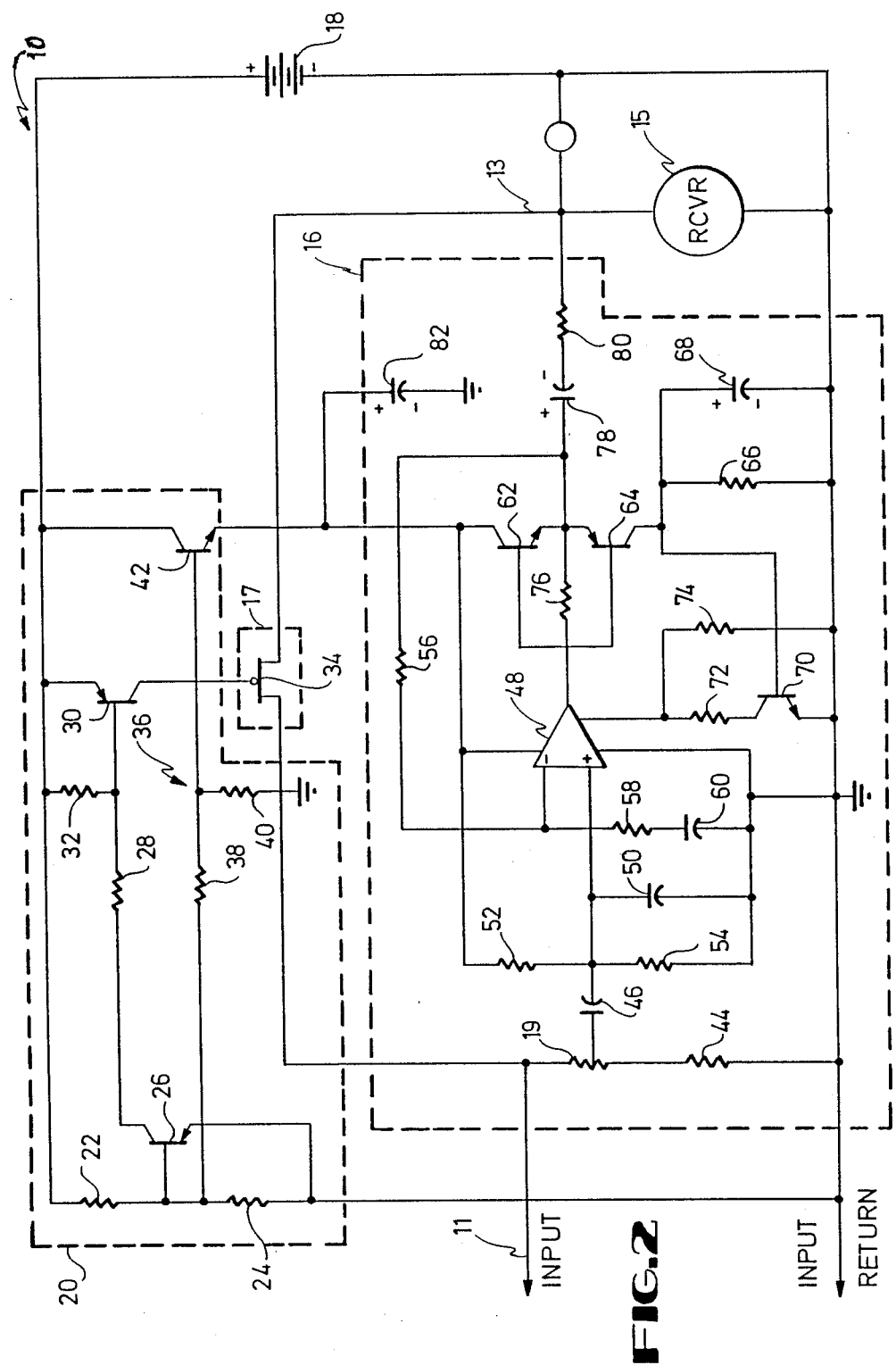
FIG. 2 is a detailed electrical schematic of one embodiment of the instant apparatus.

Referring now to FIG. 2, a detailed electrical schematic of the apparatus 10 is illustrated. The low voltage detector 20 generally includes those elements shown within the dashed line 20. A pair of serially connected resistors 22, 24 form a voltage divider network for determining when the battery voltage level has dropped below its preselected minimum operating voltage. The junction of the resistors 22, 24 is connected to the base of an NPN type bipolar junction transistor 26. The emitter of the transistor 26 is connected to system ground, while the collector of the transistor 26 is connected through a resistor 28 to the base of a PNP type bipolar junction transistor 30 and to the positive terminal of the battery 18 through a resistor 32. The emitter of the transistor 30 is also connected to the positive terminal of the battery 18, while the collector of the transistor 30 is connected to the low voltage bypass 17.

It should be noted that system ground corresponds to the negative terminal of the battery 18 and to the input return line connected to the base unit 12. The electrical connection between the handset 14 and base unit 12 typically includes four wires, two of which are connected to the receiver portion 15 and two of which are connected to the transmitter portion.

The low voltage bypass 17 includes a field effect transistor 34 that has its gate connected to the collector of the transistor 30, its source connected to the input line 11, and its drain connected to the receiver 15.

Thus, it should be appreciated that as long as the voltage appearing at the junction of the resistors 24, 22 is greater than the bias voltage of the transistor 26, transistor 26 remains biased "on" and communicates current from the battery 18 through the resistors 32, 28. The voltage drop across the resistor 32 is sufficient to bias the transistor 30 "on," thereby allowing current to flow from the battery 18 through the transistor 30 to the low voltage bypass 17. This current provided to the low voltage bypass 17 biases the field effect transistor 34 "off" and eliminates the direct connection between the input line 11 and receiver 15. However, when the voltage of the battery 18 falls to a sufficient level (i.e. 4.5 volts) such that the voltage appearing at the junction of the resistors 24, 22 is less than the bias voltage level of transistor 26, then transistor 26 is biased "off" so that no current flows through the resistor 32 and the transistor 30 is biased "off." Since the transistor 30 is biased "off," no current flows to the low voltage bypass 17 and the field effect transistor 34 is biased "on," thereby bypassing the audio signal present on the input line 11 directly to the receiver 15 and eliminating the controllable amplifier 16. Therefor, it should be appreciated that when the battery 18 falls below the minimum operating voltage of the apparatus 10, the voltage level detector 20 signals the low voltage bypass 17 to interconnect the input line 11 directly to the output line 13 and receiver 15.

In this manner, the controllable amplifier 16 does not block the audio signal from being delivered to the receiver 15. Rather, when battery voltage falls below the minimum operating level of the controllable amplifier 16, the apparatus reverts to normal unamplified operation by bypassing the controllable amplifier 16.

Additionally, the collector of the transistor 30 is also connected to the base of the transistor 26 through a resistor 38. In this manner, the switching level of the transistor 26 is provided with a small amount of hysteresis (preferably 0.5v). This hysteresis prevents rapid switching of the transistor 26 when the battery voltage is substantially equal to the minimum operating voltage of the apparatus 10. When the transistor 30 is biased "on" it delivers a small amount of current through the resistor 24, thereby enhancing the voltage level appearing across the resistor 24 at the base of transistor 26. Thus, when the transistor 30 is biased "on," the voltage level presented across the resistor 24 is slightly elevated by the current provided by the transistor 30. However, when the transistors 30 and 26 are biased "off," no additional current is provided through the transistor 30 to the resistor 24. Thus, the voltage level appearing across the resistor 24 is not enhanced and is slightly lower (i.e. approximately 0.5V) than when the transistor 30 is biased "on."

An NPN type bipolar junction transistor 42 also has its base connected the collector of the transistor 30. The collector of the transistor 42 is connected to the positive terminal of the battery 18, while the emitter of the transistor 42 is connected to the controllable amplifier 16. Thus, it should be appreciated that as long as the voltage level of the battery 18 exceeds the minimum operating voltage level of the apparatus 10, the transistor 42 is biased "on" by the voltage drop occurring across the resistor 40 from the current delivered through the transistor 30. Thus, ordinarily the battery 18 provides current through the transistor 42 to the controllable amplifier 16. However, when the voltage of the battery 18 drops below the minimum operating voltage level, the transistor 30 is biased "off" and no current is provided to the resistor 40. Thus, the voltage drop across the resistor 40 is insufficient to bias the transistor 42 "on," thereby interrupting the supply of power 18 to the controllable amplifier 16. It should be appreciated that the signals supplied by the voltage level detector 20 to the low voltage bypass 17 and controllable amplifier 16 are complimentary in nature.

The input signal from the telephone base unit 12 is communicated over the input line 11 to the controllable amplifier 16 where it is presented across potentiometer 19 and resistor 44. The potentiometer 19 allows for adjustment of the amplifier gain, and the resistor 44 limits the lowest level of the gain adjustment. That is to say, if the potentiometer 19 is adjusted to an ohmic value of zero, the resistor 44 is still within the circuit and the voltage drop occurring across resistor 44 accounts for the minimum voltage that is presented to the controllable amplifier 16.

A capacitor 46 couples the audio signal to the noninverting input of an operational amplifier 48. A noise reducing capacitor 50 is also connected to the noninverting input of the operational amplifier 48 and acts to eliminate radio frequency interference by bypassing that interference to system ground.

A DC offset is added to the audio signal via a pair of resistors 52, 54 in that they are connected to the positive terminal of the battery 18 through the transistor 42 and to system ground. Thus, by selecting the relative values of the resistors 52, 54, the DC offset is adjusted to the desired level.

The inverting input of the operational amplifier 48 also includes a feedback circuit having a feedback resistor 56 connected between its output and inverting input. Further, a resistor 58 and serially connected capacitor 60 are also connected between the inverting input of the operational amplifier 48 and system ground. The resistor 58 and capacitor 60 form an AC return to system ground and set the maximum gain at approximately 26 dB. The time constant of these components also gives a low frequency roll-off, dropping the gain by approximately 5 dB at 300 Hz.

The output of the operational amplifier 48 is connected to a complimentary emitter follower formed from a pair of bipolar junction transistors 62, 64 having their emitters connected together and their bases connected to the output of the operational amplifier 48. The transistor 62 is of the NPN type, while the transistor 64 is of the PNP type. The collector of the transistor 62 is connected through the transistor 42 to the positive terminal of the battery 18, while the collector of the transistor 62 is connected through a parallel combination of a resistor 66 and capacitor 68 to system ground, as well as to the base of a NPN type bipolar junction transistor 70. The emitter of the transistor 70 is connected to system ground while the collector of the transistor 70 is connected through a resistor 72 to a control input port of the operational amplifier 48. A resistor 74 is connected in parallel with the serial combination of the transistor 70 and resistor 72. Therefor, when the transistor 70 is biased "on," the parallel combination of the resistor 72, 74 are connected to the control input port of the operational amplifier 48. However, when the transistor 70 is biased "off," only the resistor 74 is connected to the control input port of the operational amplifier 48.

Thus, the operational amplifier 48 is controllably switched between first and second modes of operation by controlling the switching of the transistor 70. Preferably, the operational amplifier is part number OP-32 produced by Precision Monolithic Incorporated located at 1500 Space Park Drive, Santa Clara, Calif. 95050. The operational amplifier 48 is controllably switchable between a high power and low power mode of operation. When the operational amplifier 48 is configured to operate in the high power mode of operation, the slew rate of the operational amplifier 48 is greatly enhanced so as to allow the operational amplifier 48 to track rapidly varying audio signals. For example, when the audio signal presented to the operational amplifier 48 is of a large magnitude, the slope of the audio signal is significantly greater than when the peak-to-peak magnitude of the audio signal is much smaller. Therefor, when the audio signal is detected to be greater than a preselected magnitude, the operational amplifier 48 is switched to the high power mode of operation by biasing the transistor 70 "on."

While the high power mode of the operational amplifier 48 is better suited to reproducing the high amplitude audio signals without clipping the peaks thereof, it also requires greater power from the battery 18 in order to operation. Thus, when a conversation of a low or normal volume occurs, the operational amplifier configured in the low power mode is capable of supplying sufficient current to drive the receiver 15. Thus, to extend the life of the battery by reducing the quiescent current draw, the operational amplifier 48 is switched to the low power mode of operation by biasing the transistor 70 "off." Only when the peak values of the audio signal exceed the slue rate of the operational amplifier 48 is the operational amplifier 48 switched to the high powered mode of operation.

The transistors 62, 64 form a complimentary emitter follower to provide the required current drive for the receiver 15. In order to conserve current, the transistors 62, 64 are not supplied with a bias current. While this configuration would normally result in excessive crossover distortion, the open loop gain of the operational amplifier 48 is used to significantly reduce this crossover distortion effect. A resistor 76 is connected between the output of the operational amplifier 48 and the emitters of the transistor pair 62, 64. The resistor 76 couples low level audio signals directly to the receiver 15 to smooth the transition from the low to the high signal level. This effect is described in greater detail in conjunction with the discussion of FIGS. 3 and 4 below.

A series combination of a capacitor 78 and resistor 80 are disposed between the resistor 76 and receiver 15. The capacitor 78 blocks the DC component of the audio signal while coupling the amplified audio signal. The resistor 80 operates as a current limiting resistor to limit the maximum current provided to the receiver 15.

Figure 3:
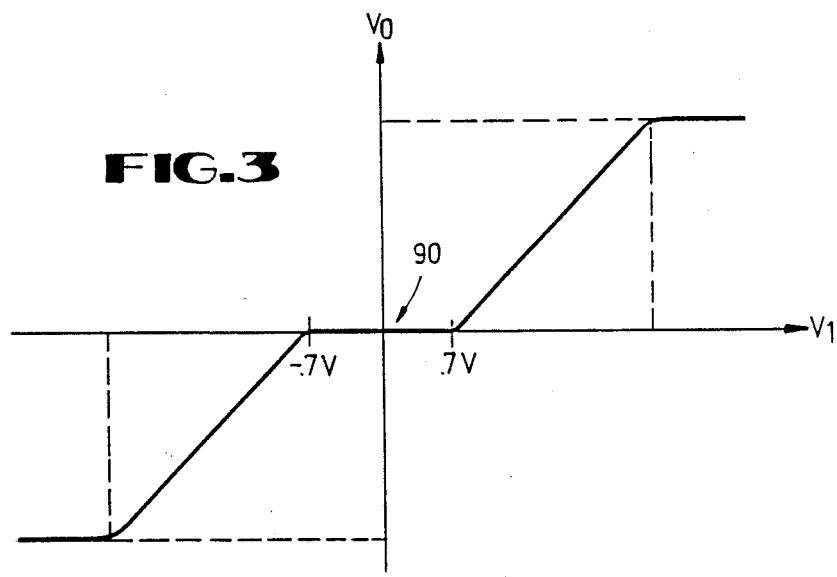
FIG. 3 is a graphical representation of the transfer characteristic of a class B output stage.

FIG. 3 illustrates the transfer characteristic for a standard class B output stage. For example, the complementary emitter follower, shown in FIG. 2, would have the same transfer characteristic absent the resistor 76. The dead band region, generally indicated as element number 90, corresponds to the bias voltage for the transistors 62, 64. It should be appreciated that in the region of $-0.7V$ to approximately $0.7V$ neither of the transistors 62, 64 is biased "on." Therefore, no signal would pass to the receiver 15 absent the resistor 76. In the regions above and below, 0.7V and −0.7V respectively the transistors 62, 64 are respectively biased "on" and linearly track the input voltage.

Figure 4:
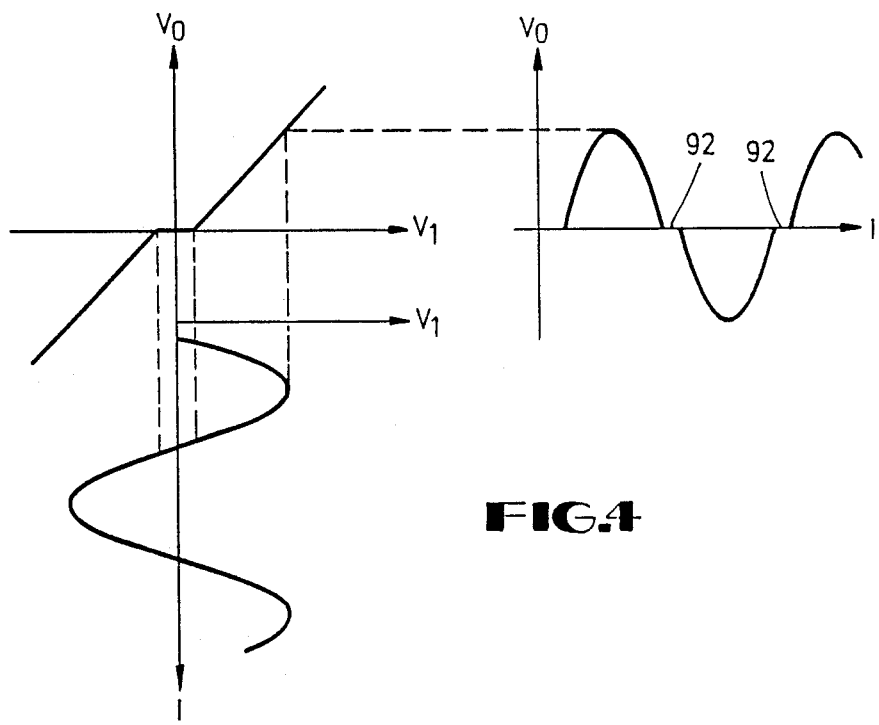
FIG. 4 is a graphical representation of the crossover distortion typically caused by a complimentary emitter follower.

The dead band region 90 accounts for the crossover distortion experience by class B output stages. This crossover distortion can best be appreciated by considering its affect on a sine wave passed through the output stage. Referring to FIG. 4, the sine wave audio signal is shown relative to the output stage transfer characteristic and its resulting output. It can be seen that the ultimate output of the class B output stage generally corresponds to the input sine wave, with slight reductions in magnitude, except at the 0 voltage crossings. Here, the dead band regions produce a discontinuous distortion of the sine wave, as shown at 92.

The transistors 62, 64 are never biased "on" at the same time and, in fact, in the deadband region neither of the transistors 62, 64 are biased "on" as the sine wave increases from the zero voltage up to 0.7V both of the transistors 62, 64 are biased "off." Above 0.7V the transistor 62 is biased "on" and the battery 18 supplies current through the transistor 62 to the receiver 15. When the sine wave again falls below 0.7V both transistors 62, 64 are biased "off" until the signal falls below minus 0.7V. At this point the transistor 64 is biased "on" and the capacitor 68 supplies current to the receiver 15 through the transistor 64. At the same time, the voltage level of the capacitor 68 is at a sufficient level to bias the transistor 70 "on," thereby converting the operational amplifier 48 to the high power mode of operation. The resistor 66 prevents the capacitor 68 from discharging immediately after the transistor 64 is biased "off." Rather, the time constant of the resistor 66 and capacitor 68 is sufficient to insure that the operational amplifier 48 is not continuously toggled between the high and low power modes of operation, but will remain in the high power mode of operation for a sufficient time period after the negative peak value of the audio signal does not exceed the minus 0.7V level.

The addition of the resistor 76, interconnecting the output of the operational amplifier 48 with the emitters of the transistors 62, 64, results in the audio signal output of the operational amplifier 48 being passed to the receiver at all times. While the signal generally has insufficient current driving capabilities to operate the receiver at high output levels, it does have sufficient current driving capabilities to operate the receiver 15 at low output powers. Therefor, the significant portion of the audio signal passed through the resistor 76 generally only corresponds to the deadband region of the complementary emitter follower. In other words, the low power audio output signal from the operational amplifier 48 controls the operation of the receiver 15 in the dead band region to provide an overall generally continuous sign wave, free from the crossover distortion. Instead of passing nothing during the deadband region, the resistor couples the audio signal from the operational amplifier to the receiver 15.

I claim:

1. An apparatus for controllably amplifying an audio signal delivered to a receiver, comprising;
   a battery adapted for delivering electrical power to said apparatus;
   means for detecting the voltage level of said battery and delivering first and second voltage level signals in response to said battery voltage being respectively greater than and less than a preselected level;
   means for receiving the audio signal and amplifying the audio signal, and delivering the amplified audio signal to said receiver in response to receiving the first voltage level signal; and
   means for receiving the audio signal and bypassing the amplifier means to deliver the audio signal directly to the receiver in response to receiving the second voltage level signal.

2. An apparatus, as set forth in claim 1, wherein said amplifier means includes an operational amplifier adapted to receive the audio signal and deliver an amplified signal corresponding to the audio signal, and means for monitoring the magnitude of the amplified signal and delivering a third signal in response to said amplified signal exceeding a preselected magnitude, said operational amplifier having first and second modes of operation wherein said operational amplifier is configured to operate in said first and second modes in response to the absence and presence of said third signal respectively.

3. An apparatus, as set forth in claim 2, wherein the output of said amplifier is connected the bases of a pair of transistors connected as a complimentary emitter followers and to the commonly connected emitters of the transistors through a resistor, the collectors of the transistors are connected to said battery whereby when the voltage level of the operational amplifier output exceeds the bias voltage of the transistors, the current drive capability of the apparatus is enhanced.

4. An apparatus for controllably amplifying an audio signal delivered to a receiver, comprising:
   amplifier means for receiving the audio signal, amplifying said audio signal, and delivering said amplified audio signal to said receiver, said amplifier means having first and second modes of operation and being controllably switchable therebetween in response to receiving first and second control signals respectively, said first and second modes of operation being discrete high and low power modes of operation respectively wherein the amplifier means consumes more power in the high power mode of operation than in the low power mode of operation;
   means for receiving the amplified audio signal and delivering said first and second control signals in response to said amplified signal respectively exceeding and being less than a predetermined magnitude.

5. An apparatus, as set forth in claim 4, wherein said amplifier means has a higher slew rate in said high power mode of operation than in said low power mode of operation.

6. An apparatus, as set forth in claim 4, wherein said control signal delivering means includes means for delivering said first control signal for a preselected duration of time after said amplified audio signal falls below said predetermined magnitude.

7. An apparatus, as set forth in claim 4, including:
   a battery adapted for delivering electrical power to said apparatus;
   means for detecting the voltage level of said battery and delivering first and second voltage level signals in response said to battery voltage being respectively greater than and less than a preselected level;

said amplifier means delivering the amplified audio signal to said receiver only in response to receiving the first voltage level signal; and means for receiving the audio signal and bypassing the amplifier means to deliver the audio signal directly to the receiver in response to receiving the second voltage level signal.

8. An apparatus for controllably amplifying an audio signal delivered to a receiver, comprising:

a source of electrical power;

means for receiving the audio signal, amplifying the audio signal, controllably switching between first and second modes of operation in response to receiving first and second control signals respectively, and delivering the amplified audio signal;

means for receiving the amplified audio signal and delivering said first and second control signals in response to said amplified signal respectively exceeding and being less than a predetermined magnitude;

first and second transistors connected as a complementary emitter follower having their emitters connected together and to the receiver, their bases adapted to receive the amplified audio signal, and their collectors connected to opposite poles of the source of electrical power; and a resistor adapted to receive the amplified audio signal and deliver the amplified audio signal to the emitters of the first and second transistors.

9. An apparatus, as set forth in claim 8, wherein said amplifying means first and second modes of operation are high and low power modes of operation respectively whereby the amplifying means consumes more power in the high power mode of operation than in the low power mode of operation.

10. An apparatus, as set forth in claim 9, wherein said operational amplifying has a higher slew rate in said high power mode of operation than in said low power mode of operation.

11. An apparatus, as set forth in claim 8, wherein said control signal delivering means includes means for delivering said first control signal for a preselected duration of time after said amplified audio signal falls below said predetermined magnitude.

12. An apparatus, as set forth in claim 8, wherein said source of electrical power includes a battery adapted for delivering electrical power to said apparatus; and said apparatus includes means for detecting the voltage level of said battery and delivering first and second voltage level signals in response said to battery voltage being respectively greater than and less than a preselected level;

said amplifying means delivering the amplified audio signal to said receiver only in response to receiving the first voltage level signal; and means for receiving the audio signal and bypassing the amplifying means to deliver the audio signal directly to the receiver in response to receiving the second voltage level signal.

* * * * *

UNITED STATES PATENT AND TRADEMARK OFFICE
CERTIFICATE OF CORRECTION

PATENT NO. : 4,951,002

DATED : August 21, 1990

INVENTOR(S) : David O. Hanon

It is certified that error appears in the above-identified patent and that said Letters Patent is hereby corrected as shown below:

Column 7, line 60, insert --76-- after "resistor"
        line 61, insert --48-- after "amplifier"

Column 10, line 8, cancel "operational" and insert --means-- after "amplifying"

Signed and Sealed this

Fourteenth Day of January, 1992

Attest:

HARRY F. MANBECK, JR.

*Attesting Officer*      *Commissioner of Patents and Trademarks*